Feb. 24, 1970  E. L. LITTAUER  3,497,434
METHOD FOR PREVENTING FOULING OF METAL IN A MARINE ENVIRONMENT
Filed July 20, 1967

INVENTOR.
ERNEST L. LITTAUER
BY
George C. Sullivan
Agent

3,497,434
METHOD FOR PREVENTING FOULING OF METAL IN A MARINE ENVIRONMENT
Ernest L. Littauer, Hollywood, Calif., assignor to Lockheed Aircraft Corporation, Burbank, Calif.
Filed July 20, 1967, Ser. No. 654,888
Int. Cl. C23f *13/00*
U.S. Cl. 204—147      3 Claims

ABSTRACT OF THE DISCLOSURE

Metals toxic to marine organisms are anodically dissolved under controlled conditions to prevent fouling by marine organisms of structures immersed in a marine environment.

---

The invention relates generally to the prevention of marine fouling and more particularly to a method of anodically dissolving toxic metals in sea water to prevent marine fouling.

In the past, protection against animal and plant fouling of underwater structures and particularly metal structures has been by the use of antifouling paints. In general, the use of toxic materials in coatings has had limited success with respect to a reasonable life expectancy due to the fact that control of dissolution of the toxin is uncertain. It has been recognized that little or no fouling occurs when a ship is underway, and thus antifouling is desirable only when the ship is at rest in the water, such as when docked or at anchor.

Other attempts to discourage attachment of marine organisms have used electrical impulses. For some strange reason(s), the organisms seem to become immune to the impulses.

A primary object of the invention is to provide antifouling of underwater structures.

Another object of the invention is to provide controlled dissolution of toxins in sea water.

A further object of the invention is to provide electrochemical antifouling of structures in a marine environment.

The foregoing objects are accomplished by the present means and method which comprise coating underwater metallic structures with metals toxic to marine organisms, anodically dissolving the metallic coatings, distributing the products of dissolution over the structure, and preventing further dissolution when fouling is not likely to occur. It is understood that the term "metals" includes both pure metallic elements and alloys of such elements.

For an understanding of the invention reference is now made to the following description when taken with the attached drawing in which.

It has been discovered that certain metals, particularly zinc and cadmium, are toxic to marine organisms, when such metals are dissolved in the marine environment. It is known that certain metals, when made anodic in aqueous electrolytes such as sea water cannot be dissolved freely due to gradual development of a high resistance insulating oxide or compound. Cadmium and zinc are no exception to this, and anodic dissolution gradually reduces due to formation of such a layer. Addition of small quantities (about 0.1 to 0.3%) tin to cadmium forms an alloy which anodically dissolves freely in sea water. Likewise, addition of about 0.1% aluminum and 0.05% cadmium to zinc forms an alloy which dissolves freely. Other zinc alloy compositions are also known which dissolve freely in sea water, and are disclosed in literature and patents relating to sacrificial zinc anodes for cathodic protection purposes. It is further desirable that the zinc have a very low iron content.

Application of the zinc or cadmium coating to the metallic structure may be accomplished by plating, flame spraying and the like. Or the coating may comprise resins or the like containing metallic particles of cadmium and/or zinc, and so formulated as to have the desired electrical and physical characteristics. Also, such coatings may consist of formulations wherein a significant portion of the toxin consists of salts or other compounds of cadmium and zinc.

It is recognized that metal structures in sea water may be protected cathodically. Thus, a potential (cathodic) is applied to the coating thereby preventing dissolution. A potential of about —900 mv. vs. a silver-silver chloride reference electrode is necessary for cadmium and approximately —1100 to 1200 mv. for zinc. When a ship or other structure is stationary and to be protected from marine fouling, the potential is adjusted to the range of —650 to —700 mv. for cadmium and about —1050 mv. for zinc, whereupon the metal dissolves creating a poisonous level of 1.8 to 2.4 ma./ft.$^2$ to inhibit growth, whereas Conversely, when the ship or structure is moving at, say, five knots or more speed, and protection against fouling is no longer necessary, further dissolution of the metal is prevented by adjusting the potential to the protective cathodic potential. Combining the present invention with a cathodic system, for example, as described in U.S. Patents No. 2,982,714, No. 2,998,371 or No. 3,108,939, will provide both anti-corrosion and antifouling.

Figure 1:
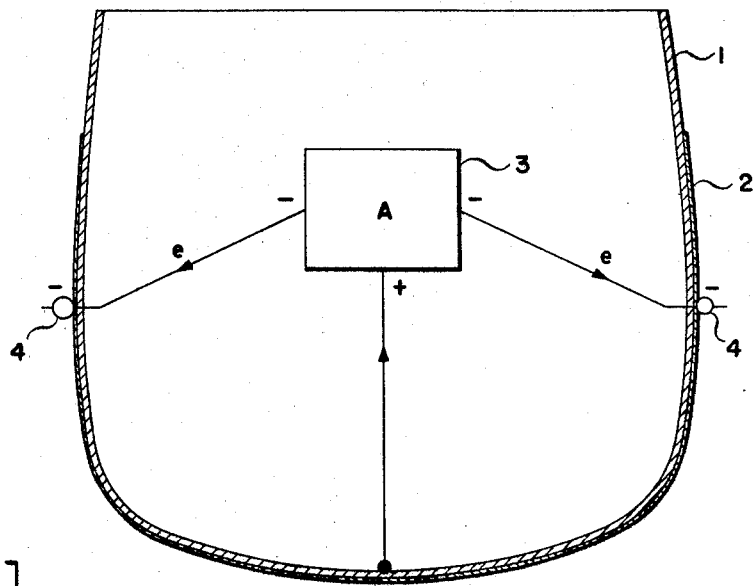
FIG. 1 is a schematic diagram of a typical installation illustrating a ship in harbor.

More particularly, when a ship is at rest, such as in harbor, the system might be illustrated as shown in FIG. 1. The hull 1 is coated with a thin layer of zinc or cadmium alloy indicated at 2. Since dissolution is proportional to current, a controlled current power source 3 is connected between the hull-coating and an auxiliary counter electrode 4. The source 3 is adjusted to provide a positive current density of 1.8 to 3.6 milliamps per square foot (ma./ft.$^2$) of wetted surface depending on local environmental factors to control dissolution of the coating at a level needed to kill the organisms. For example, studies in San Diego Harbor indicate a continuous level of 1.8 to 2.4 ma./ft.$^2$ to inhibit growth, whereas 3.6 ma./ft.$^2$ have been used to provide the same effect in Hawaii. In other words, the current density levels needed to inhibit growth varies as the rate of growth which is greater in higher water temperatures.

The controlled current power source 3 moves electrons $e$ from the hull-coating to the electrode 4, a conductive circuit being established through the sea water. At the current level mentioned above the potential of the hull zinc coating measured against a silver-silver chloride reference cell is about —1050 millivolts which permits dissolution of the zinc and yet is sufficiently negative to prevent corrosion of any bare steel areas on the hull. It is well-known that the corroding potential of steel is about —600 mv. and the protective potential is around —900 mv.

Figure 2:
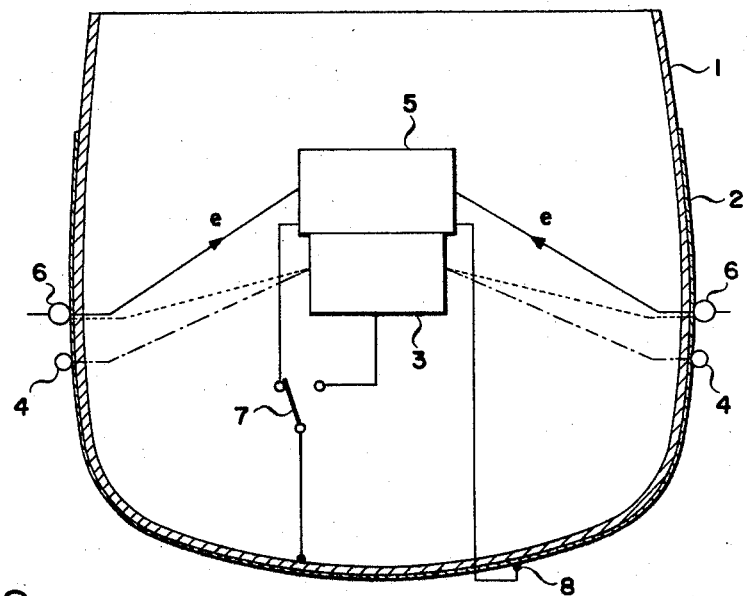
FIG. 2 is a schematic diagram of a typical installation illustrating a ship underway.

When the ship is under way, fouling due to attachment of marine organisms is unlikely to occur. In such case, a cathodic system may be used to prevent further dissolution of the coating as well as to provide anticorrosion for the hull in a known manner. For example, FIG. 2 illustrates typical conditions under way. A cathodic system 5, such as described in the above patents, is energized and the current power source 3 is de-energized, as exemplified by the two position switch 7. In this case, the hull-coating is made cathodic with respect to the permanent anodes 6 as indicated by the direction of electrons $e$. The current density, which is dependent on speed, temperature, etc., as recognized in the art, identified as controlled potential cathodic protection, is applied to maintain the hull-coating potential relative to a silver-silver chloride reference electrode 8 at about $-1100$ to 1200 mv. to prevent dissolution of the coating and at the same time continues protection of bare steel areas.

It will be noted that both permanent anodes 6 and auxiliary electrode 4 are illustrated in FIG. 2. This arrangement might be desirable if the permanent anodes 6 are of the type described in U.S. Patent No. 3,108,939 since the lead-platinum anode does not function well as a cathode for the antifouling phase. The optional auxiliary electrode 4 would be connected to the power source 3 as indicated by broken line. However, where a suitable permanent anode is desired both sources 3 and 5 may be connected to the anode 6 as indicated by the dotted line.

While specific embodiments of the invention have been shown and described, it should be understood that certain alterations, modifications and substitutions may be made to the instant disclosure without departing from the spirit and scope of the invention as defined by the appended claims.

What is claimed is:

1. A method for prevention of fouling of a metal structure immersed in a marine environment comprising coating said structure with a metal toxic to marine organisms, anodically dissolving the metal coating while said structure is substantially at rest in the environment by passing direct current between the coating and the structure as the anode and a counter electrode as the cathode, and cathodically protecting said metal coating and said metal structure when said metal structure is moving in the environment at a speed which precludes fouling.

2. The method defined by claim 1 wherein the coating metal is cadmium to which about 0.1 to 0.3% tin is added.

3. The method defined by claim 1 wherein the coating metal is a zinc alloy capable of being dissolved anodically in sea water and consisting of zinc and about 0.1% aluminum and 0.05% cadmium.

References Cited

UNITED STATES PATENTS

| 820,105 | 5/1906 | Frazier | 204—197 |
| 843,357 | 2/1907 | Partee et al. | 204—147 |
| 3,241,512 | 3/1966 | Green | 204—196 |
| 3,303,118 | 2/1967 | Anderson | 204—196 |

FOREIGN PATENTS

| 754,812 | 8/1956 | Great Britain. |
| 858,905 | 1/1961 | Great Britain. |

T. TUNG, Primary Examiner

U.S. Cl. X.R.

204—149, 196